US012768691B2

(12) United States Patent
Matsui et al.

(10) Patent No.: US 12,768,691 B2
(45) Date of Patent: Oct. 20, 2026

(54) ULTRASONIC FLOWMETER

(71) Applicant: Keyence Corporation, Osaka (JP)

(72) Inventors: Hiroki Matsui, Osaka (JP); Shinichiro Otsu, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 442 days.

(21) Appl. No.: 18/372,102

(22) Filed: Sep. 24, 2023

(65) Prior Publication Data

US 2024/0125634 A1 Apr. 18, 2024

(30) Foreign Application Priority Data

Oct. 17, 2022 (JP) ................................ 2022-166039

(51) Int. Cl.
*G01F 1/66* (2022.01)
*G01F 1/667* (2022.01)
*G01F 15/14* (2006.01)

(52) U.S. Cl.
CPC .............. *G01F 1/662* (2013.01); *G01F 1/667* (2013.01); *G01F 15/14* (2013.01)

(58) Field of Classification Search
CPC ........... G01F 1/662; G01F 1/667; G01F 15/14
USPC ....................................................... 73/861.28
See application file for complete search history.

(56) References Cited

U.S. PATENT DOCUMENTS 6,065,350 A * 5/2000 Hill ........................ G01F 1/662 73/866.5
9,671,263 B2 6/2017 Otsu et al.
9,671,264 B2 6/2017 Kashima
9,696,195 B2 7/2017 Ishikawa et al.
10,190,896 B2 1/2019 Makino et al.
10,641,628 B2 5/2020 Niimura
10,641,629 B2 5/2020 Tsukigi et al.
10,732,018 B2 8/2020 Tsukigi et al.
10,845,225 B2 11/2020 Kawaguchi
2005/0210999 A1* 9/2005 Sylvia .................. G01F 15/185 73/861.29

(Continued)

FOREIGN PATENT DOCUMENTS

JP 2020109360 A 7/2002
JP 2016223800 A 12/2016

(Continued)

OTHER PUBLICATIONS

U.S. Appl. No. 18/372,105, filed Sep. 24, 2023 (61 pages).
Office Action issued in corresponding Japanese Patent Appln No. 2022-166039 dated Aug. 18, 2026 (14 pages).

*Primary Examiner* — Nathaniel T Woodward
(74) *Attorney, Agent, or Firm* — Kilyk & Bowersox, P.L.L.C.

(57) ABSTRACT

To enable accurate measurement when a flow rate is measured using an ultrasonic signal. An ultrasonic flowmeter includes a first ultrasonic element and a second ultrasonic element, a damping pipe, a first ultrasonic propagator and a second ultrasonic propagator, which are arranged outside the damping pipe, and a flow rate measurement unit that measures a flow rate based on an ultrasonic signal transmitted and received between the first ultrasonic element and the second ultrasonic element. The first ultrasonic element, the first ultrasonic propagator, the damping pipe, the second ultrasonic element, and the second ultrasonic propagator are accommodated in a housing.

17 Claims, 8 Drawing Sheets

(56) References Cited

U.S. PATENT DOCUMENTS

| | | | | |
|---|---|---|---|---|
| 2011/0271769 | A1* | 11/2011 | Kippersund | G01F 1/86<br>73/861.28 |
| 2015/0300861 | A1 | 10/2015 | Regen et al. | |
| 2018/0113013 | A1* | 4/2018 | Gestner | G01N 29/024 |

FOREIGN PATENT DOCUMENTS

| | | | |
|---|---|---|---|
| JP | 2018077081 | A | 5/2018 |
| JP | 2020165760 | A | 10/2020 |

* cited by examiner

ULTRASONIC FLOWMETER

CROSS-REFERENCE TO RELATED APPLICATIONS

The present application claims foreign priority based on Japanese Patent Application No. 2022-166039, filed Oct. 17, 2022, the contents of which are incorporated herein by reference.

BACKGROUND OF THE INVENTION

1. Field of the Invention

The disclosure relates to an ultrasonic flowmeter that measures a flow rate of a fluid flowing through a flow path using an ultrasonic signal.

2. Description of Related Art

As a measuring instrument that measures a flow rate of a fluid flowing through a flow path, a thermal flow sensor is generally known. The thermal flow sensor includes an upstream heater and a downstream heater arranged in a flow path, detects a change in temperature distribution of the upstream heater and the downstream heater when a fluid flows, and measures a flow rate based on a result of the detection.

In the thermal flow sensor, however, measurement is not stable when uneven flow or turbulent flow flutters occur, and thus, a rectifying plate is required upstream of the heaters. When the rectifying plate is provided, a pressure loss is generated, the rectifying plate is easily clogged with contaminants so that the pressure loss may be further increased. Further, the heaters of the thermal flow sensor are vulnerable to dirt and are fragile, which is disadvantageous.

Meanwhile, an ultrasonic flowmeter is known as a measuring instrument that measures a flow rate of a fluid flowing through a flow path using an ultrasonic signal (see, for example, JP 2020-109360 A and JP 2016-223800 A). An ultrasonic flowmeter disclosed in JP 2020-109360 A is a clamp-on type ultrasonic flowmeter that is detachably attached to an outer wall of metal piping and measures a flow rate of a gas from the outside of the metal piping. A measurement principle of the clamp-on type ultrasonic flowmeter of JP 2020-109360 A is a so-called propagation time difference type in which an ultrasonic signal is caused to obliquely pass through the gas flowing in the metal piping, a propagation time difference of the ultrasonic signal is measured between a direction along the flow and a direction opposite to the flow, and a flow velocity and the flow rate of the gas are calculated from the propagation time difference.

Further, an ultrasonic flowmeter of JP 2016-223800 A includes a measurement flow path portion that defines a flow path through which a target fluid flows.

Pipes are connected to an inlet and an outlet of the measurement flow path portion, respectively. While the fluid flowing into the measurement flow path portion from the pipe connected to the inlet flows through the measurement flow path portion, a flow rate of the fluid is measured by an ultrasonic element attached to the measurement flow path portion, and the fluid of which the flow rate has been measured flows out from the pipe connected to the outlet.

Meanwhile, for example, in a pneumatic system such as an air cylinder, operation timing adjustment, adjustment of a blow rate, and the like of the air cylinder are adjusted by a speed controller, an opening amount of a throttle valve based on an air pressure set by a regulator. If a flowmeter is arranged in the middle of a flow path of the pneumatic system, an operation of the pneumatic system can be managed based on a flow rate, which is effective.

However, if the thermal flow sensor is arranged, an adjustment condition varies due to the generation of the pressure loss by the rectifying plate described above, so that readjustment is required, and highly frequent adjustment and maintenance are required due to the clogging over time.

In this regard, if the clamp-on type ultrasonic flowmeter of JP 2020-109360 A is used, it is unnecessary to arrange the rectifying plate in the flow path, and thus, it is considered that a problem as in the case of arranging the thermal flow sensor does not occur.

However, the clamp-on type ultrasonic flowmeter of JP 2020-109360 A enables accurate measurement of the flow rate of the fluid by enhancing a signal using a resonance phenomenon of the metal piping and improving a signal-to-noise ratio (S/N). Therefore, the attachment to the metal piping is a premise, and the clamp-on type ultrasonic flowmeter is not suitable for a pipe made of a soft resin which is generally used in the pneumatic system.

Further, in JP 2020-109360 A, it is possible to measure a liquid flowing inside by transmitting an ultrasonic signal for flow rate measurement from the outside of the metal piping, but, when a target fluid is a gas as in the pneumatic system, most of the ultrasonic signal is reflected at an interface between the metal piping and the gas because a difference in an acoustic impedance between the metal piping and the gas is large, and there is a problem that it is difficult to increase the signal intensity.

On the other hand, in the ultrasonic flowmeter of JP 2016-223800 A, an accurate flow rate can be measured even if the target fluid is a gas since the ultrasonic element is attached to the measurement flow path portion. However, since the ultrasonic element is exposed to the gas, contaminants contained in the gas are likely to adhere to the ultrasonic element, and the measurement accuracy deteriorates over time.

SUMMARY OF THE INVENTION

The disclosure has been made in view of such a point, and an object thereof is to enable accurate measurement when a flow rate is measured using an ultrasonic signal.

In order to achieve the above object, according to one embodiment of the disclosure, it is possible to assume an ultrasonic flowmeter that measures a flow rate of a fluid flowing through a flow path using an ultrasonic signal. The ultrasonic flowmeter includes: a first ultrasonic element that transmits and receives the ultrasonic signal; a second ultrasonic element that transmits and receives the ultrasonic signal; a damping pipe that defines the flow path and attenuates the ultrasonic signal; a first ultrasonic propagator that is arranged outside the damping pipe and propagates the ultrasonic signal between the first ultrasonic element and the damping pipe; a second ultrasonic propagator that is arranged outside the damping pipe and propagates the ultrasonic signal between the second ultrasonic element and the damping pipe; and a flow rate measurement unit that measures a flow rate of the flow path defined by the damping pipe based on the ultrasonic signal transmitted and received between the first ultrasonic element and the second ultrasonic element. The first ultrasonic element, the first ultrasonic propagator, the damping pipe, the second ultrasonic element, and the second ultrasonic propagator are accommodated in a housing. An external pipe can be made to communicate with the flow path of the damping pipe via a connection interface.

That is, the ultrasonic signal transmitted from the ultrasonic element propagates to the fluid through the ultrasonic propagator, but reflection at an interface between the ultrasonic propagator and the fluid increases if a difference in an acoustic impedance between the ultrasonic propagator and the fluid is large as in a conventional example, and the ultrasonic signal hardly propagates to the fluid and stays in the ultrasonic propagator. The ultrasonic signal staying in the ultrasonic propagator flows into a reception-side element through the housing and is received by the reception-side element, and this may become a noise component to serve as a factor of deteriorating an S/N.

On the other hand, in the present embodiment, the damping pipe is interposed between the first ultrasonic propagator and the fluid and between the second ultrasonic propagator and the fluid, and thus, a difference in an acoustic impedance between the first ultrasonic propagator and the fluid and a difference in an acoustic impedance between the second ultrasonic propagator and the fluid both decrease, and the reflection of the ultrasonic signal at the interface is reduced. This makes it difficult for the ultrasonic signal to stay in the first ultrasonic propagator and the second ultrasonic propagator. As a result, ultrasonic signal flowing into the reception-side element via the housing decreases, and thus, the noise component is reduced, the S/N is improved, and the measurement accuracy of the flow rate measured by the flow rate measurement unit is improved.

According to another embodiment of the disclosure, the damping pipe can be made of a material having an ultrasonic signal attenuation capacity, and examples of such a material include nylon, Teflon (registered trademark), polyurethane, and the like. When an acoustic coupling member is interposed between the damping pipe and the first ultrasonic propagator and between the damping pipe and the second ultrasonic propagator, the ultrasonic signal transmitted from each of the ultrasonic elements is easily transmitted to the damping pipe, and a stray signal can be suppressed.

Further, an inner surface and an outer surface of a part of the damping pipe through which the ultrasonic signal passes may be configured by smooth surfaces. As a result, unevenness or the like can be eliminated on a course of the ultrasonic signal, and the noise component is further reduced.

Further, an inner diameter of the damping pipe may be set to be larger than an inner diameter of the external pipe. As a result, a flow velocity of the fluid flowing into the damping pipe from the external pipe decreases, and thus, the flow rate can be measured even when the fluid is flowing through the external pipe at a high velocity.

Further, an enlarged flow path, whose inner diameter is enlarged as a distance to the damping pipe decreases, may be provided between the damping pipe and the external pipe. As a result, generation of a turbulent flow is suppressed, for example, when the fluid flows into the damping pipe from the external pipe or flows into the external pipe from the damping pipe, and thus, the measurement accuracy is improved.

Further, a connection pipeline may be provided between the damping pipe and the connection interface. In this case, the enlarged flow path can be provided in the connection pipeline.

Further, a pressure measurement unit that measures the pressure of the fluid flowing through the flow path of the damping pipe may be further provided. In this case, an access path communicating with the flow path of the damping pipe may be provided between the damping pipe and the connection interface, and the pressure measurement unit may be provided so as to face the access path. This enables measurement of a mass flow rate.

Further, the connection interface may include an upstream connection interface for connection with the external pipe on an upstream side and a downstream connection interface for connection with the external pipe on a downstream side. In this case, the upstream connection interface, the damping pipe, and the downstream connection interface can be arranged so as to be sequentially located on the same straight line from the upstream side to the downstream side in a flow direction of the fluid.

Further, a center block to which an upstream part and a downstream part of the damping pipe are fixed may be provided. In this case, the upstream connection interface and the downstream connection interface are fixed to the upstream part and the downstream part of the center block, respectively, and the first ultrasonic propagator and the second ultrasonic propagator can also be fixed to the center block. As a result, a relative positional relationship of the respective members can be set with high accuracy.

Further, the damping pipe may be made of a material softer than a material forming the center block, or may be made of a material softer than materials forming the first ultrasonic propagator and the second ultrasonic propagator.

As described above, the ultrasonic propagator is arranged outside the damping pipe that defines the flow path through which the fluid flows such that the ultrasonic signal is propagated to the fluid through the ultrasonic propagator, and thus, the noise component can be reduced and the flow rate can be accurately measured when the flow rate is measured using the ultrasonic wave signal.

BRIEF DESCRIPTION OF THE DRAWINGS

FIG. 5A is a comparative example, and FIG. 5B is the invention;

DETAILED DESCRIPTION OF PREFERRED EMBODIMENTS

Hereinafter, an embodiment of the invention will be described in detail with reference to the drawings. Note that the following description of the preferred embodiment is merely an example in essence, and is not intended to limit the invention, its application, or its use.

Figure 1:
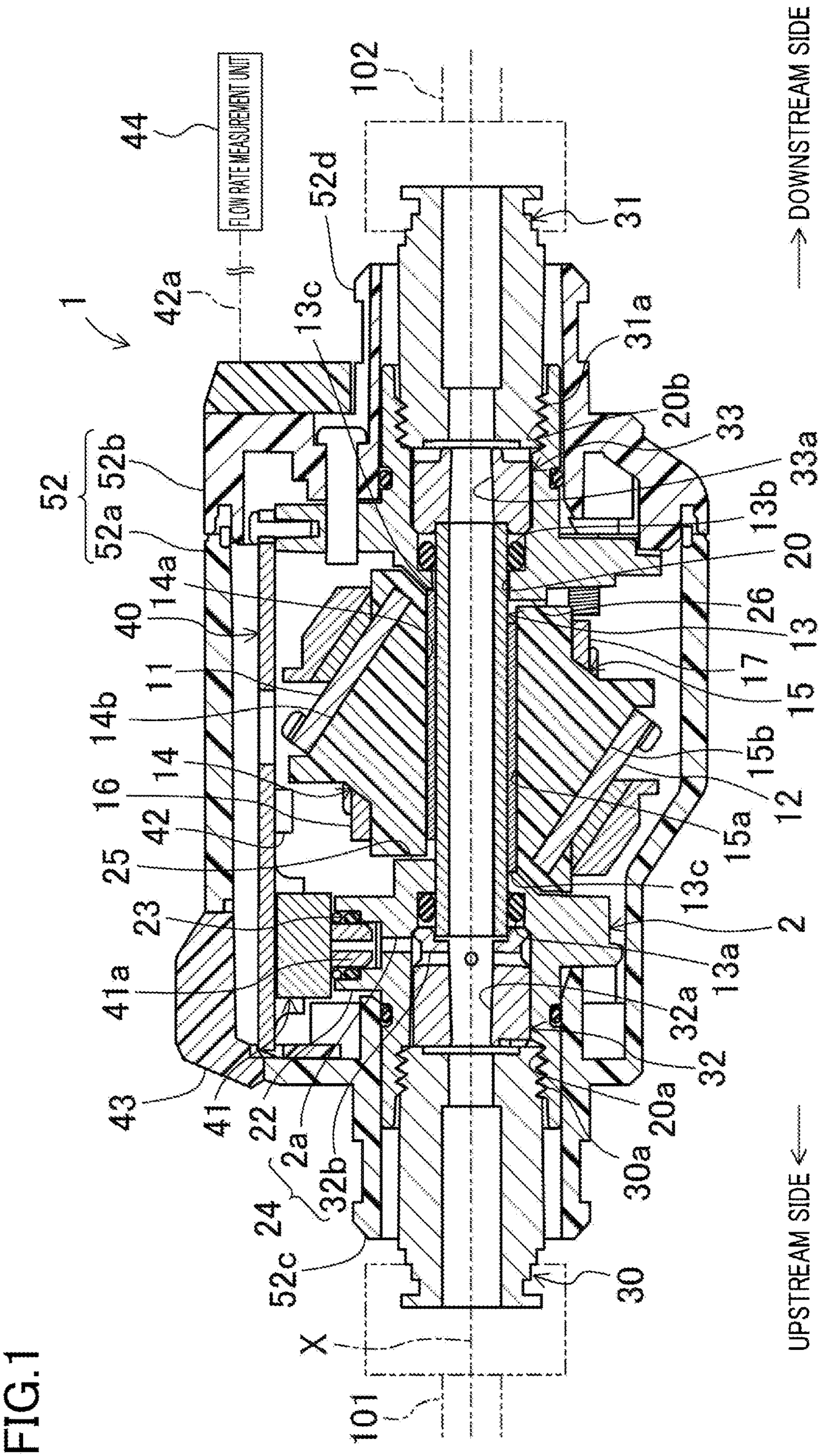
FIG. 1 is a sectional view of an ultrasonic flowmeter according to an embodiment of the invention.

FIG. 1 is a sectional view of an ultrasonic flowmeter 1 according to an embodiment of the invention. The ultrasonic flowmeter 1 is configured to be able to measure flow rates of various gases including compressed air, for example. The ultrasonic flowmeter 1 can be incorporated in a pneumatic system (not illustrated) and used. The pneumatic system is roughly classified into a system for application of a drive system, a system for application of a discharge system, and a system for application of a suction system. The system for application of a drive system is a system that applies a force to a member using the pressure of compressed air, such as an air cylinder, a chuck, or a press-fitting machine. The system for application of a discharge system is used, for example, in blowing, purging, spraying of a paint or the like, seating, a leak test, and the like. The system for application of a suction system is used for, for example, suction and vacuuming.

The pneumatic system is provided with a pipe through which the compressed air, compressed by a compressor, flows. The pipe is provided with a speed controller, a throttle valve, and the like, and operation timing adjustment, adjustment of a blow rate, and the like of the air cylinder or the like are adjusted by the speed controller, an opening amount of the throttle valve based on an air pressure set by a regulator. In the present embodiment, the ultrasonic flowmeter 1 is provided in the middle of the pipe of the pneumatic system, and the ultrasonic flowmeter 1 measures a flow rate of a fluid flowing through a flow path using an ultrasonic signal such that an operation of the pneumatic system can be managed based on the flow rate. The ultrasonic flowmeter 1 can also measure a flow rate of, for example, nitrogen, argon, or the like in addition to the compressed air. The fluid whose flow rate is measured by the ultrasonic flowmeter 1 can also be referred to as, for example, a target fluid or a fluid to be measured.

Hereinafter, a specific structure of the ultrasonic flowmeter 1 will be described. The ultrasonic flowmeter 1 is provided between an upstream external pipe 101 and a downstream external pipe 102. The upstream external pipe 101 is an external pipe located upstream of the ultrasonic flowmeter 1, and the downstream external pipe 102 is an external pipe located downstream of the ultrasonic flowmeter 1. The upstream external pipe 101 and the downstream external pipe 102 are made of the same member, and are made of a flexible material such as nylon, Teflon, or polyurethane. Note that the upstream and the downstream are defined only for convenience of description, and do not limit an actual use state.

Each of the upstream external pipe 101 and the downstream external pipe 102 is a portion of the pipe provided in the pneumatic system, and the compressed air flows from the upstream external pipe 101 to the downstream external pipe 102. When the ultrasonic flowmeter 1 is attached to the pneumatic system, a portion of an existing pipe is cut, and then, the ultrasonic flowmeter 1 can be installed between the upstream external pipe 101 and the downstream external pipe 102 with an upstream side of the cut portion as the upstream external pipe 101 and a downstream side of the cut portion as the downstream external pipe 102. That is, the ultrasonic flowmeter 1 can be installed by cutting the existing pipe. Note that the ultrasonic flowmeter 1 can also be incorporated in a pneumatic system when the pneumatic system is newly installed.

The ultrasonic flowmeter 1 includes a first ultrasonic element 11, a second ultrasonic element 12, a damping pipe 13, a first ultrasonic propagator 14, and a second ultrasonic propagator 15. The first ultrasonic element 11 and the second ultrasonic element 12 both transmit and receive ultrasonic signals, and are configured by, for example, a piezoelectric element or the like and have a plate shape as a whole. The damping pipe 13 defines a flow path through which a target fluid flows, and is made of a member that attenuates the ultrasonic signals transmitted from the first ultrasonic element 11 and the second ultrasonic element 12. Specifically, the damping pipe 13 is made of, for example, nylon, Teflon, polyurethane, or the like as a material having an ultrasonic signal attenuation capacity, and is made of a material softer than materials forming the first ultrasonic propagator 14 and the second ultrasonic propagator 15.

An inner surface and an outer surface of a part of the damping pipe 13 through which the ultrasonic signals pass are configured by smooth surfaces having no unevenness. In the present embodiment, the inner surface and the outer surface are the smooth surfaces over the entire length direction of the damping pipe 13, the ultrasonic signals transmitted from the first ultrasonic element 11 and the second ultrasonic element 12 are transmitted as intended. Further, a member (for example, a mesh, a filter, or the like) existing in a direction intersecting a flow direction of the fluid is not provided in the flow path of the damping pipe 13. That is, the damping pipe 13 is configured by a circular pipe member having a flow path completely penetrating therethrough from an upstream end to a downstream end. Further, since the inner surface of the damping pipe 13 is configured by the smooth surface, dirt is less likely to accumulate on the inner surface of the damping pipe 13. Note that an outer diameter of the damping pipe 13 can be set in a range of, for example, 3 mm or more and 20 mm or less.

The first ultrasonic element 11 is located on one side in the radial direction (the upper side in FIG. 1) outside the damping pipe 13. The first ultrasonic propagator 14 propagates the ultrasonic signal between the first ultrasonic element 11 and the damping pipe 13, and is arranged between the first ultrasonic element 11 and the damping pipe 13 outside the damping pipe 13. A pipe-side surface 14*a* of the first ultrasonic propagator 14 on the damping pipe 13 side is configured by a surface extending in parallel with a pipe axis X of the damping pipe 13. An element-side surface 14*b* of the first ultrasonic propagator 14 on the first ultrasonic element 11 side is inclined by a predetermined angle with respect to the pipe axis X so as to be away from the pipe axis X of the damping pipe 13 as proceeding toward the upstream side.

Therefore, angles of the pipe-side surface 14*a* and the element-side surface 14*b* of the first ultrasonic propagator 14 with respect to the pipe axis X are different from each other, whereby the first ultrasonic propagator 14 has a wedge shape whose thickness dimension increases as proceeding toward the upstream side. Thus, the first ultrasonic propagator 14 can also be referred to as a first wedge member. The first ultrasonic propagator 14 can be made of, for example, polyphenyl sulfone (PPSU), polyphenylene sulfide (PPS), or the like.

A transmission/reception surface 11*a* of the first ultrasonic element 11 transmitting and receiving the ultrasonic signal is configured by a flat surface. The transmission/reception surface 11*a* of the first ultrasonic element 11 is in contact with the element-side surface 14*b* of the first ultrasonic propagator 14. For this reason, the transmission/reception surface 11*a* of the first ultrasonic element 11 is also inclined by a predetermined angle with respect to the pipe axis X of the damping pipe 13.

An acoustic coupling member 13*c* is interposed between the damping pipe 13 and the first ultrasonic propagator 14. An outer surface of the damping pipe 13 is in contact with the acoustic coupling member 13*c*, and the pipe-side surface 14*a* of the first ultrasonic propagator 14 is in contact with the acoustic coupling member 13*c*. The acoustic coupling member 13*c* may be a member constituting a portion of the damping pipe 13 or may be a member constituting a portion of the first ultrasonic propagator 14. The acoustic coupling member 13*c* is made of, for example, a viscoelastic body made of rubber, grease, or the like. When the acoustic coupling member 13*c* is made of rubber, the acoustic coupling member can be made of cross-linked rubber, for example, butyl rubber (isobutyene-isoprene rubber (IIR)), ethylene (ethylene-propylene rubber (EPDM)), nitrile rubber (NBR) (acrylonitrile-butadiene rubber (BR), fluororubber (FKM), epichlorohydrin rubber (ECO), norbornene rubber (NOR), or the like. Further, when the acoustic coupling member 13*c* is made of rubber, rubber molded into a sheet shape in advance can be used.

The second ultrasonic element 12 is located on the other side in the radial direction (the lower side in FIG. 1) outside the damping pipe 13, and the first ultrasonic element 11 and the second ultrasonic element 12 are arranged so as to sandwich the damping pipe 13 in the radial direction. The second ultrasonic propagator 15 propagates the ultrasonic signal between the second ultrasonic element 12 and the damping pipe 13, and is arranged between the second ultrasonic element 12 and the damping pipe 13 outside the damping pipe 13. Therefore, the flow rate of the target fluid is measured during the flow through the flow path of the damping pipe 13. The acoustic coupling member 13*c* is also interposed between the damping pipe 13 and the second ultrasonic propagator 15. The second ultrasonic propagator 15 can be made of a resin material similar to that of the first ultrasonic propagator 14.

A pipe-side surface 15*a* of the second ultrasonic propagator 15 on the damping pipe 13 side is configured by a surface extending in parallel with the pipe axis X of the damping pipe 13. An element-side surface 15*b* of the second ultrasonic propagator 15 on the second ultrasonic element 12 side is inclined by a predetermined angle with respect to the pipe axis X so as to be away from the pipe axis X of the damping pipe 13 as proceeding toward the downstream side. The pipe-side surface 15*a* of the second ultrasonic propagator 15 and the pipe-side surface 14*a* of the first ultrasonic propagator 14 are parallel to each other, and the element-side surface 15*b* of the second ultrasonic propagator 15 and the element-side surface 14*b* of the first ultrasonic propagator 14 are parallel to each other.

Therefore, angles of the pipe-side surface 15*a* and the element-side surface 15*b* of the second ultrasonic propagator 15 with respect to the pipe axis X are different from each other, whereby the second ultrasonic propagator 15 has a wedge shape whose thickness dimension increases as proceeding toward the downstream side, which is opposite to the first ultrasonic propagator 14. Therefore, the second ultrasonic propagator 15 can also be referred to as a second wedge member.

Similarly to the first ultrasonic element 11, a transmission/reception surface 12*a* of the second ultrasonic element 12 transmitting and receiving the ultrasonic signal is configured by a flat surface. The transmission/reception surface 12*a* of the second ultrasonic element 12 is in contact with the element-side surface 15*b* of the second ultrasonic propagator 15. For this reason, the transmission/reception surface 12*a* of the second ultrasonic element 12 is also inclined by a predetermined angle with respect to the pipe axis X of the damping pipe 13.

The ultrasonic flowmeter 1 further includes a center block 2 having a shape elongated in the flow direction of the target fluid. The center block 2 is made of a highly rigid member such as metal or hard resin. Therefore, the damping pipe 13 is made of a material softer than a material forming the center block 2, and has a higher ultrasonic signal attenuation capacity than the material forming the center block 2.

In the center block 2, an insertion hole 20 into which the damping pipe 13 is inserted is formed to penetrate in the flow direction of the fluid. The upstream part and the downstream part of the damping pipe 13 are fixed to the center block 2 in a state of being inserted into the insertion hole 20. That is, the damping pipe 13 can also be referred to as a built-in pipe built in the ultrasonic flowmeter 1.

Further, the first ultrasonic propagator 14 and the second ultrasonic propagator 15 are also fixed to the center block 2. The first ultrasonic element 11 is fixed to the first ultrasonic propagator 14, and the second ultrasonic element 12 is fixed to the second ultrasonic propagator 15.

Figure 3:
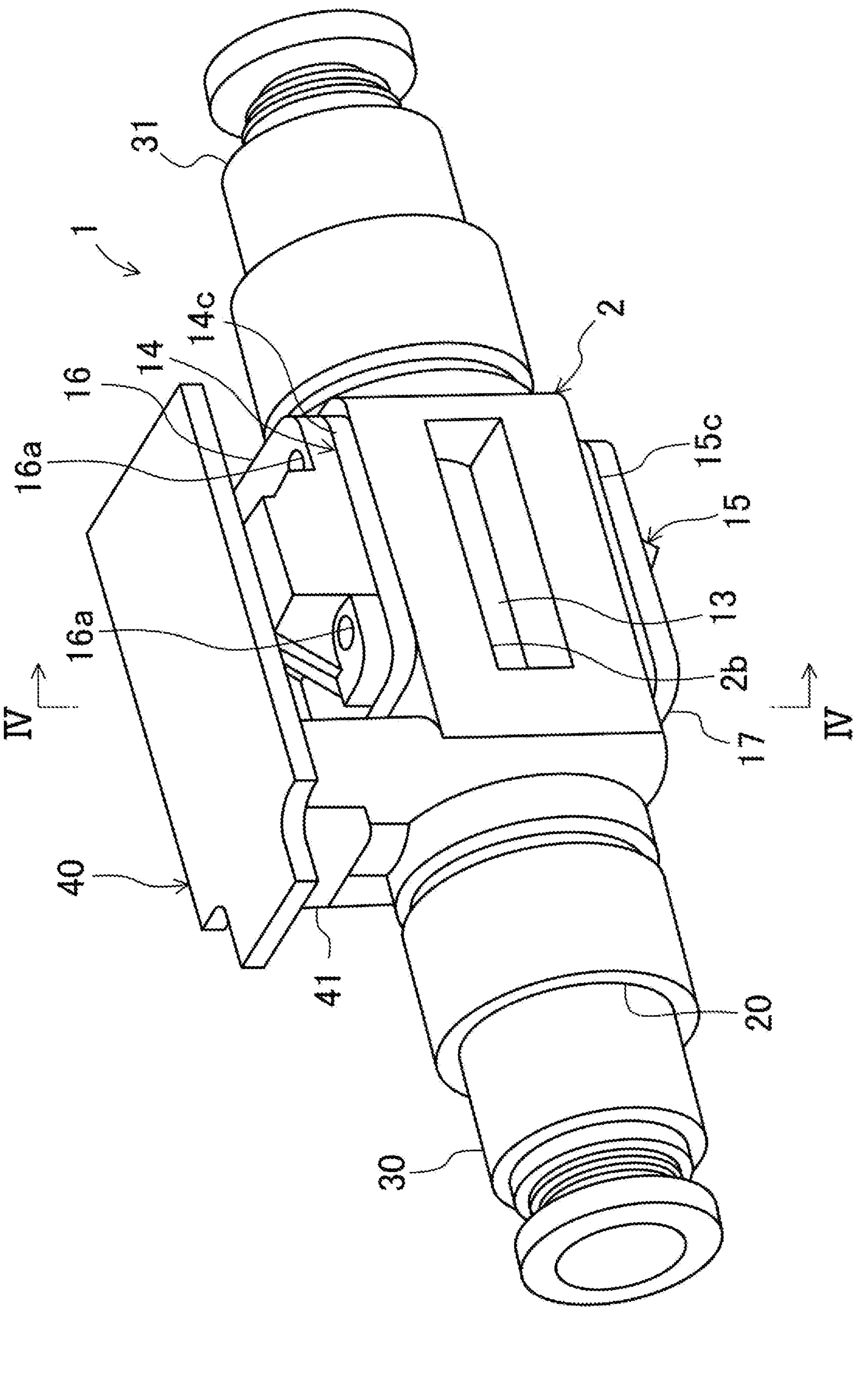
FIG. 3 is a perspective view of the ultrasonic flowmeter in which a shield is omitted.

Specifically, a first opening 25 into which the first ultrasonic propagator 14 on the damping pipe 13 side is inserted is formed in the center block 2. As illustrated in FIG. 3, a first flange portion 14*c* superimposed on an outer surface of the center block 2 is formed on the first ultrasonic propagator 14. A first holder 16 is superimposed on the first flange portion 14*c*. A screw insertion hole 16*a* through which a fixing screw (not illustrated) is inserted is formed in the first holder 16. The screw inserted into the screw insertion hole 16*a* penetrates through the first flange portion 14*c* of the first ultrasonic propagator 14 and is screwed into the center block 2. As a result, the first ultrasonic propagator 14 is fastened and fixed to the center block 2. Further, the first ultrasonic element 11 is pressed against the first ultrasonic propagator 14 by the first holder 16 as illustrated in FIG. 1.

Further, a second opening 26 into which the second ultrasonic propagator 15 on the damping pipe 13 side is inserted is formed in the center block 2. As illustrated in FIG. 3, a second flange portion 15*c* superimposed on the outer surface of the center block 2 is formed in the second ultrasonic propagator 15. The second holder 17 is superimposed on the second flange portion 15*c*. A screw insertion hole (not illustrated) through which a fixing screw (not illustrated) is inserted is formed in second holder 17. Therefore, the second ultrasonic propagator 15 can be fastened and fixed to the center block 2 similarly to the first ultrasonic propagator 14. Further, the second ultrasonic element 12 is pressed against the second ultrasonic propagator 15 by the second holder 17 as illustrated in FIG. 1.

The ultrasonic flowmeter 1 further includes an upstream connection interface 30, a downstream connection interface 31, an upstream connection pipeline 32, and a downstream connection pipeline 33. The upstream connection interface 30, the upstream connection pipeline 32, the damping pipe 13, the downstream connection pipeline 33, and the downstream connection interface 31 are arranged so as to be sequentially located on the same straight line from the upstream side to the downstream side in the fluid flow direction. This straight line is a straight line formed by the pipe axis X of the damping pipe 13 and an extension line thereof. Note that the upstream connection pipeline 32 and the downstream connection pipeline 33 are provided as necessary, and may be omitted.

An upstream pipe sealing member 13*a* and a downstream pipe sealing member 13*b*, which are O-rings, are provided in close contact with outer surfaces of the upstream part and the downstream part of the damping pipe 13, respectively. The upstream pipe sealing member 13*a* is in close contact with an inner surface on the upstream side of the insertion hole 20, and a space between the upstream part of the damping pipe 13 and the insertion hole 20 is sealed by the upstream pipe sealing member 13*a*. Further, the downstream pipe sealing member 13*b* is in close contact with an inner surface on the downstream side of the insertion hole 20, and the downstream part of the damping pipe 13 and the insertion hole 20 are sealed by the downstream pipe sealing member 13*b*.

Figure 4:
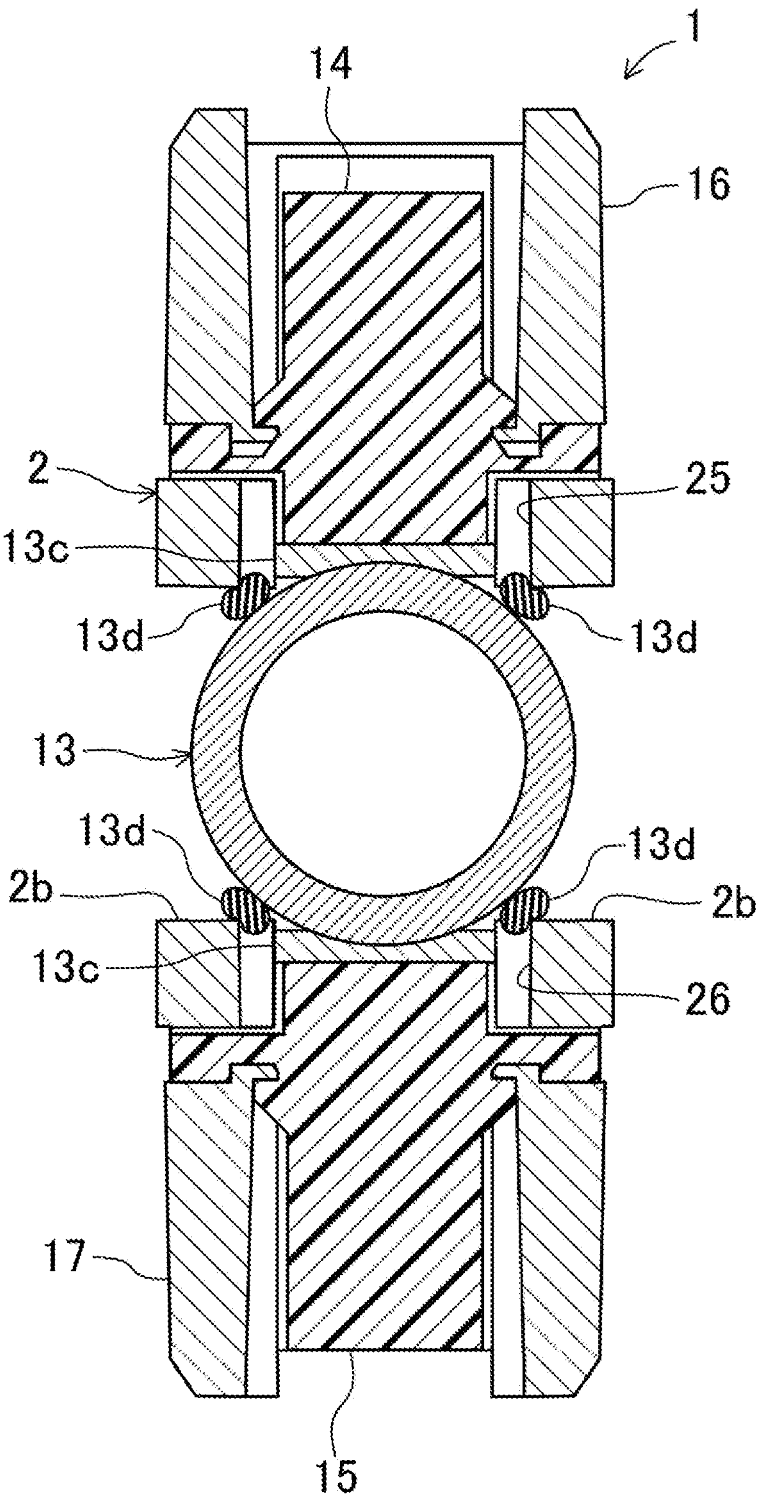
FIG. 4 is a sectional view taken along line IV-IV in FIG. 3.

As illustrated in FIGS. 3 and 4, side surface openings 2*b* are formed on both side surfaces of the center block 2, respectively. The side surface opening 2*b* has a shape elongated in the longitudinal direction of the center block 2. The side surface opening 2*b* opens the insertion hole 20 to the side. Therefore, a portion of the damping pipe 13 is visible from the side surface opening 2*b*. Grease 13*d* can be applied from the side surface openings 2*b*. The grease 13*d* is grease that attenuates the ultrasonic signal, and is applied so as to be interposed between the center block 2 and the damping pipe 13. As a result, a sound wave propagating to the center block 2 decreases, and the sound wave can be further attenuated in the damping pipe 13.

The upstream connection interface 30 is a member for connection with the upstream external pipe 101 so as to make a flow path of the upstream external pipe 101 and the flow path of the damping pipe 13 communicate with each other. For example, a screw thread 30*a* is formed on an outer peripheral surface on the downstream side of the upstream connection interface 30. The screw thread 30*a* is screwed into a screw groove 20*a* formed on an inner peripheral surface on the upstream side of the insertion hole 20 of the center block 2, so that the upstream connection interface 30 is airtightly connected to the center block 2.

The upstream connection interface 30 is a member constituting a connection structure called one-touch fitting, tube fitting, or the like, and can connect or disconnect the upstream external pipe 101 without one-touch operation, that is, without using a tool or the like. A configuration of the upstream connection interface 30 is not limited to the above-described configuration, and various fitting structures can be adopted. Further, a shape of the upstream connection interface 30 can also be freely set.

The downstream connection interface 31 is a member for connection with the downstream external pipe 102 so as to make a flow path of the downstream external pipe 102 and the downstream side of the flow path of the damping pipe 13 communicate with each other. The downstream connection interface 31 is configured similarly to the upstream connection interface 30, and is configured such that the downstream connection interface 31 is airtightly connected to the center block 2 by screwing a screw thread 31*a* formed on an outer peripheral surface on the downstream side into a screw groove 20*b* formed on an inner peripheral surface on the downstream side of the insertion hole 20 of the center block 2. That is, the connection interface of the present embodiment includes the upstream connection interface 30 and the downstream connection interface 31, and the upstream connection interface 30 and the downstream connection interface 31 are fixed to the upstream part and the downstream part of the center block 2, respectively. Note that the upstream connection interface 30 and the downstream connection interface 31 can be fixed to the center block 2 using a fixing structure other than the screws.

The upstream connection pipeline 32 is provided between the damping pipe 13 and the upstream connection interface 30 and is a member that makes the flow path of the damping pipe 13 and the flow path of the upstream external pipe 101 communicate with each other. Specifically, the upstream connection pipeline 32 has a cylindrical shape and is held in a state of being inserted into the upstream side of the insertion hole 20 of the center block 2. The upstream side of the flow path of the upstream connection pipeline 32 communicates with the flow path of the upstream connection interface 30, and the downstream side of the flow path of the upstream connection pipeline 32 communicates with the flow path of the damping pipe 13.

Here, an inner diameter of the damping pipe 13 is set to be larger than an inner diameter of the upstream external pipe 101. As a result, a flow velocity of the fluid flowing into the damping pipe 13 from the upstream external pipe 101 decreases, and thus, it is possible to measure the flow rate in the damping pipe 13 even when the fluid is flowing through the upstream external pipe 101 at a high velocity. Note that the inner diameter of the damping pipe 13 and the inner diameter of the upstream external pipe 101 may be the same, or the inner diameter of the damping pipe 13 may be smaller than the inner diameter of the upstream external pipe 101 although not illustrated.

In the present embodiment, a flow path in the upstream connection pipeline 32 is formed as an enlarged flow path 32*a* whose inner diameter is enlarged as a distance to the damping pipe 13 decreases since the inner diameter of the damping pipe 13 is set to be larger than the inner diameter of the upstream external pipe 101. An inner diameter of an upstream end of the enlarged flow path 32*a* is set to be substantially equal to the inner diameter of the upstream external pipe 101 and an inner diameter of a downstream end of the upstream connection interface 30. On the other hand, an inner diameter of a downstream end of the enlarged flow path 32*a* is set to be substantially equal to the inner diameter of the damping pipe 13. As a result, when the fluid flows into the damping pipe 13 from the upstream external pipe 101, generation of a turbulent flow is suppressed, and thus, the measurement accuracy is improved.

The downstream connection pipeline 33 is provided between the damping pipe 13 and the downstream connection interface 31 and is a member that makes the flow path of the damping pipe 13 and the flow path of the downstream external pipe 102 communicate with each other. Specifically, the downstream connection pipeline 33 has a cylindrical shape, and is held in a state of being inserted into the downstream side of the insertion hole 20 of the center block 2. The downstream side of the flow path of the downstream connection pipeline 33 communicates with the flow path of the downstream connection interface 31, and the upstream side of the flow path of the downstream connection pipeline 33 communicates with the flow path of the damping pipe 13.

Since the downstream external pipe 102 and the upstream external pipe 101 are the same member, the inner diameter of the damping pipe 13 is larger than an inner diameter of the downstream external pipe 102. In order to cope with this, a flow path in the downstream connection pipeline 33 is formed as a reduced flow path 33*a* whose inner diameter is reduced as a distance to the downstream connection pipeline 33 decreases. An inner diameter of an upstream end of the reduced flow path 33*a* is set to be substantially equal to the inner diameter of the damping pipe 13, and an inner diameter of a downstream end of the reduced flow path 33*a* is set to be substantially equal to the inner diameter of the downstream external pipe 102 and the inner diameter of an upstream end of the downstream connection interface 31. As a result, the generation of the turbulent flow is suppressed when the fluid flows into the downstream connection interface 31 from the damping pipe 13.

The ultrasonic flowmeter 1 further includes a circuit board 40. The circuit board 40 is arranged so as to cover the first ultrasonic element 11, and extends substantially parallel to the pipe axis X of the damping pipe 13. The first ultrasonic element 11 and the second ultrasonic element 12 are connected to the circuit board 40. Furthermore, a pressure measurement unit 41 that measures the pressure of the fluid flowing through the flow path of the damping pipe 13 and a control unit 42 are mounted on the circuit board 40. The control unit 42 may be provided outside. The pressure measurement unit 41 includes a pressure sensor configured to convert the pressure of the fluid into an electric signal and output the electric signal, and specifically, a strain gauge or the like can be used.

An arrangement structure of the pressure measurement unit 41 will be specifically described. In the upstream part of the center block 2, a tubular portion 22 into which a pressure receiving portion 41*a* of the pressure measurement unit 41 is fitted is provided so as to protrude in a direction orthogonal to the pipe axis X of the damping pipe 13. A sensor sealing member 23 made of an O-ring is provided between an inner surface of the tubular portion 22 and an outer surface of the pressure receiving portion 41*a*, and airtightness between the tubular portion 22 and the pressure receiving portion 41*a* is secured by the sensor sealing member 23.

Furthermore, an access path 24 communicating with the flow path of the damping pipe 13 is provided between the damping pipe 13 and the upstream connection interface 30 in the upstream part of the center block 2. The access path 24 includes a first channel 32*b* penetrating through a peripheral wall of the upstream connection pipeline 32 and a second channel 2*a* communicating with the first channel 32*b* and extending to reach the pressure receiving portion 41*a* of the pressure measurement unit 41. The first channel 32*b* communicates with a part between the upstream pipe sealing member 13*a* and the upstream connection interface 30 inside the insertion hole 20 of the center block 2. Further, the second channel 2*a* also communicates with a part between the upstream pipe sealing member 13*a* and the upstream connection interface 30 inside the insertion hole 20 of the center block 2. As a result, the flow path of the damping pipe 13 communicates with the inside of the tubular portion 22 via the access path 24, and the pressure receiving portion 41*a* of the pressure measurement unit 41 is provided to face the access path 24. Note that the pressure measurement unit 41 may be provided on the downstream side of the damping pipe 13 although not illustrated.

The ultrasonic flowmeter 1 also includes an indicator lamp 43, an operation unit (operation button), and a display panel (not illustrated). The indicator lamp 43 and the display panel are controlled by the control unit 42. The control unit 42 is configured by, for example, a microcomputer or the like, and controls the first ultrasonic element 11 and the second ultrasonic element 12 based on a command from an external device to start and stop flow rate measurement. Further, when a measured value falls outside a preset range, the control unit 42 changes a display mode of the indicator lamp 43 to a mode different from a previous mode. For example, a display color of the indicator lamp 43 can be changed, or the indicator lamp 43 can be made to blink. The display panel is configured by, for example, an organic EL panel, a liquid crystal panel, or the like, and displays the measured value, various types of setting information, and the like. Various settings can be made as a user operates the operation unit. An operation state of the operation unit is acquired and received by the control unit 42.

The ultrasonic flowmeter 1 also includes a flow rate measurement unit 44. The flow rate measurement unit 44 is communicably connected to the control unit 42 via a signal line 42*a*. The ultrasonic signals received by the first ultrasonic element 11 and the second ultrasonic element 12 and the pressure measured by the pressure measurement unit 41 are transmitted to the flow rate measurement unit 44 via the signal line 42*a*. Note that the flow rate measurement unit 44 may be provided on the circuit board 40.

The flow rate measurement unit 44 is configured by, for example, a microcomputer, and is a part that measures the flow rate of the flow path defined by the damping pipe 13 based on the ultrasonic signals transmitted and received between the first ultrasonic element 11 and the second ultrasonic element 12. That is, the flow rate measurement unit 44 is a propagation time difference type measurement unit. The first ultrasonic element 11 and the second ultrasonic element 12 are connected to the flow rate measurement unit 44, and the ultrasonic signals transmitted and received between the first ultrasonic element 11 and the second ultrasonic element 12 are input to the flow rate measurement unit 44.

More specifically, the first ultrasonic element 11 and the second ultrasonic element 12 are inclined with respect to the pipe axis X of the damping pipe 13, and thus, the ultrasonic waves obliquely pass through the fluid flowing in the damping pipe 13. The first ultrasonic element 11 transmits the ultrasonic signal in a direction opposite to the flow, and the second ultrasonic element 12 transmits the ultrasonic signal in a direction along the flow of the fluid. Since the ultrasonic signals are transmitted and detected in the direction along the flow of the fluid and the direction opposite to the flow, respectively, in this manner, a difference in propagation time of the ultrasonic signal is generated between the direction along the flow of the fluid and the direction opposite to the flow.

When being controlled by, for example, the control unit 42 or an external amplifier, the first ultrasonic element 11 and the second ultrasonic element 12 intermittently emit, for example, a burst wave ultrasonic signal (signal in which ultrasonic pulses on the order of several MHz form, for example, about ten clumps), and reception waveforms are sampled at a high speed by an A/D converter of the flow rate measurement unit 44. The flow rate measurement unit 44 aligns a forward reception waveform and a backward reception waveform with each time at a time point of emission as the origin, performs matching between waveform shapes while relatively shifting the waveforms in the time direction from the state, and determines a time shift amount at which the matching degree is maximum as a propagation time difference. The flow rate measurement unit 44 calculates the flow velocity and the flow rate from the determined propagation time difference. The flow rate calculated by the flow rate measurement unit 44 may be an instantaneous flow rate or an integrated flow rate.

The flow rate measurement unit 44 can also measure a mass flow rate by using the pressure measured by the pressure measurement unit 41. When measuring the mass flow rate, a temperature sensor that measures a temperature of the fluid flowing through the flow path of the damping pipe 13 may be provided to use the temperature of the fluid detected by the temperature sensor, or a sound velocity may be calculated based on the ultrasonic signals received by the first ultrasonic element 11 and the second ultrasonic element 12, and a temperature may be estimated from the calculated sound velocity and used for measuring the mass flow rate.

Figure 2:
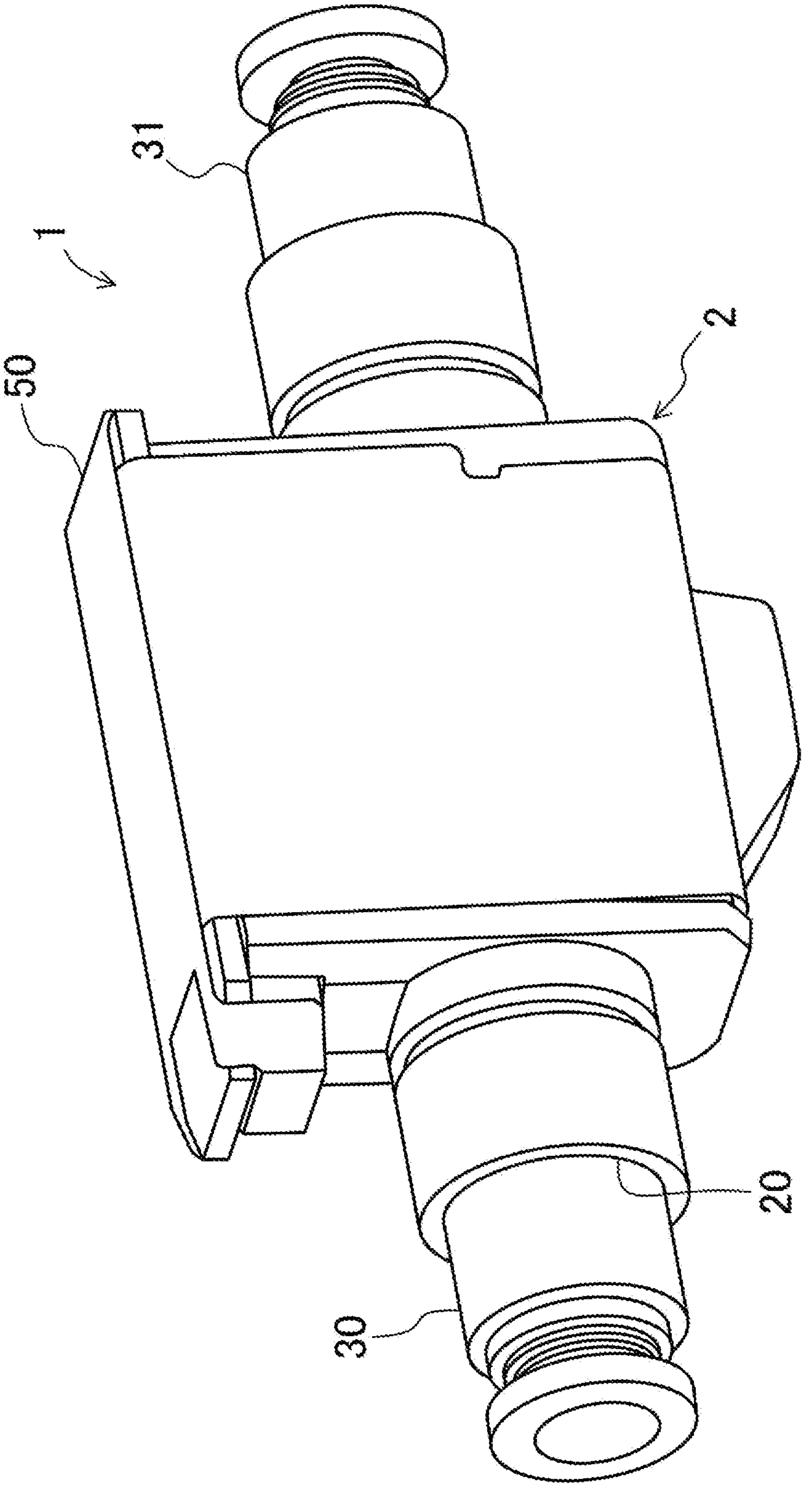
FIG. 2 is a perspective view of the ultrasonic flowmeter in which a housing is omitted.

As illustrated in FIG. 2, the ultrasonic flowmeter 1 includes a shield 50. The shield 50 is a member that suppresses a decrease in the measurement accuracy caused by external electrical noise, and is made of, for example, copper foil or the like. The first ultrasonic element 11, the second ultrasonic element 12, the damping pipe 13, the first ultrasonic propagator 14, the second ultrasonic propagator 15, the circuit board 40, the pressure measurement unit 41, and the like are covered with the shield 50.

As illustrated in FIG. 1, the ultrasonic flowmeter 1 includes a housing 52. The housing 52 is a member that accommodates at least the first ultrasonic element 11, the first ultrasonic propagator 14, the damping pipe 13, the second ultrasonic element 12, and the second ultrasonic propagator 15. In the present embodiment, the circuit board 40, the pressure measurement unit 41, the center block 2, and the like are also accommodated in the housing 52. The housing 52 is divided in the flow direction of the fluid, and has a first housing constituent portion 52*a* and a second housing constituent portion 52*b*. The first housing constituent portion 52*a* is located on the upstream side, and the second housing constituent portion 52*b* is located on the downstream side. A tubular upstream cover portion 52*c* that covers the upstream connection interface 30 is formed on the first housing constituent portion 52*a*. A tubular downstream side cover portion 52*d* that covers the downstream connection interface 31 is formed on the second housing constituent portion 52*b*. A configuration of the housing 52 is not limited to the above-described configuration, and may be configured to be dividable in the radial direction of the damping pipe 13, for example.

(Measurement of Flow Rate of Fluid)

Figure 5A:
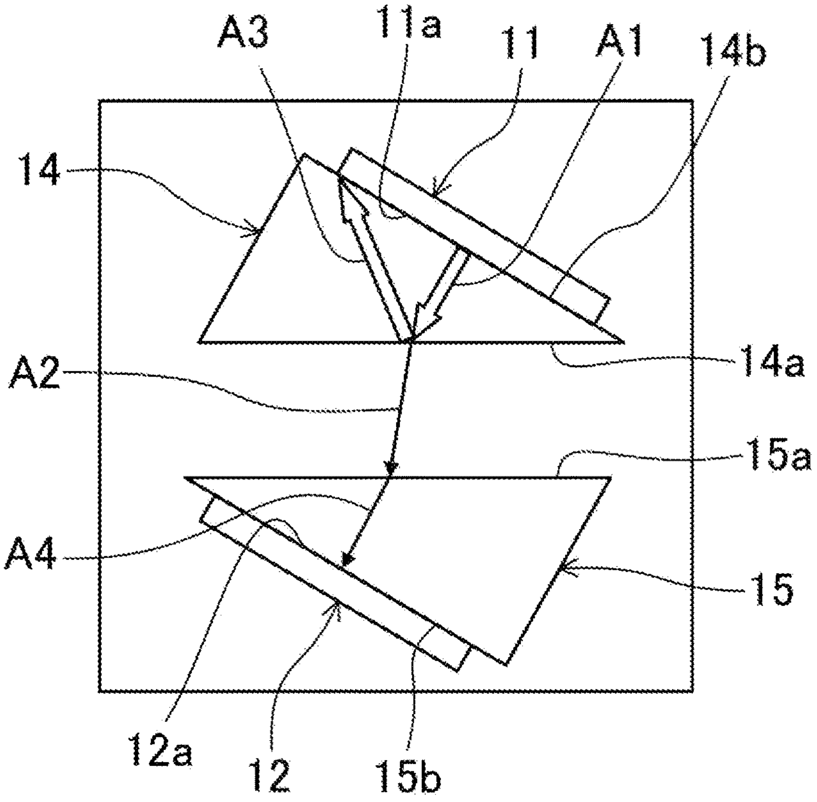
FIGS. 5A and 5B illustrate views for describing propagation of an ultrasonic signal transmitted from a first ultrasonic element.
Figure 5B:
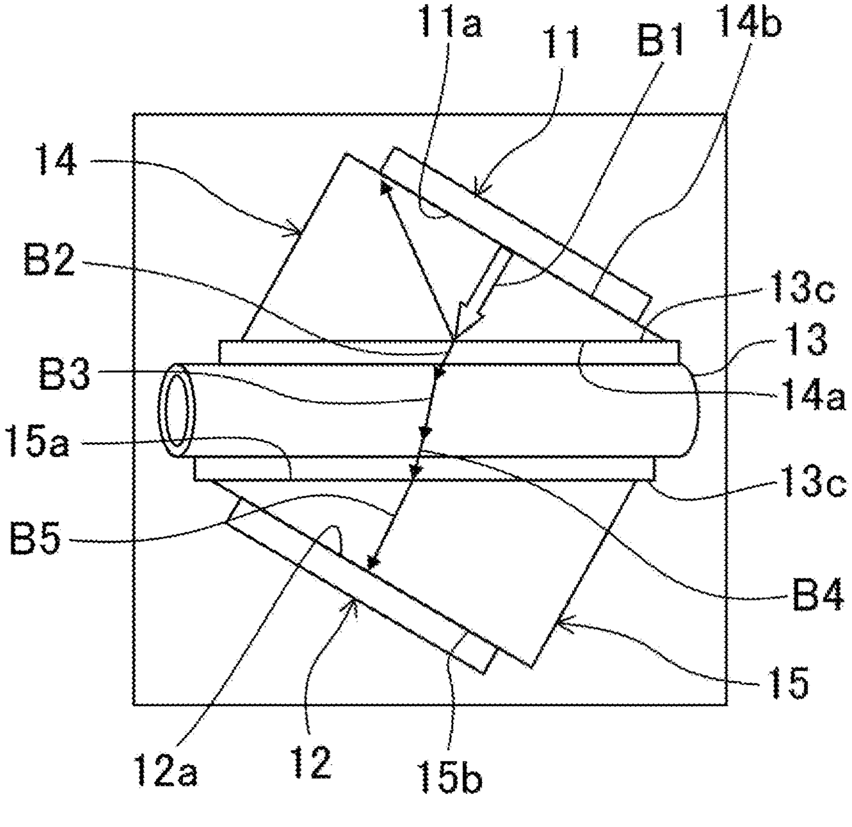

Next, a case where a flow rate of a fluid is measured using the ultrasonic flowmeter 1 configured as described above will be described. First, a comparative example will be described. FIG. 5A of FIGS. 5A and 5B illustrates the comparative example in which the first ultrasonic element 11, the second ultrasonic element 12, the first ultrasonic propagator 14, and the second ultrasonic propagator 15 are arranged so as to have a similar positional relationship as in the invention in a state where the damping pipe 13 is not provided. In this comparative example, an ultrasonic signal transmitted from the transmission/reception surface 11*a* of the first ultrasonic element 11 enters the element-side surface 14*b* of the first ultrasonic propagator 14, propagates through the first ultrasonic propagator 14 (arrow A1), and propagates from the pipe-side surface 14*a* of the first ultrasonic propagator 14 to the fluid (arrow A2). At this time, when a difference in an acoustic impedance between the first ultrasonic propagator 14 and the fluid is large as in a case where the fluid is a gas, reflection at an interface between the first ultrasonic propagator 14 and the fluid increases. A component of the ultrasonic signal reflected at the interface between the first ultrasonic propagator 14 and the fluid is indicated by arrow A3. Since there are many reflected components, the intensity of the ultrasonic signal propagating to the fluid (arrow A2) decreases. Further, the ultrasonic signal reflected at the interface between the first ultrasonic propagator 14 and the fluid stays in the first ultrasonic propagator 14. The ultrasonic signal staying in the first ultrasonic propagator 14 flows into a reception-side element (the second ultrasonic element 12) via a member such as the center block 2, and is received by the second ultrasonic element 12 (arrow A4). In this manner, the ultrasonic signal received through a different course from the fluid becomes a noise component and inhibits the measurement of the flow rate. Similarly, an ultrasonic signal transmitted from the second ultrasonic element 12 has many components reflected at an interface between the second ultrasonic propagator 15 and the fluid, and the reflected components flows into the first ultrasonic element 11 via a member such as the center block 2, are received by the first ultrasonic element 11, and become noise components.

On the other hand, in the embodiment of the invention illustrated in FIG. 5B, the damping pipe 13 defining the flow path is configured by a member that attenuates an ultrasonic signal, and thus, acoustic impedances of the first ultrasonic propagator 14 and the damping pipe 13 are close to each other. Further, the acoustic coupling member 13*c* is interposed between the first ultrasonic propagator 14 and the damping pipe 13. In the embodiment, an ultrasonic signal transmitted from the transmission/reception surface 11*a* of the first ultrasonic element 11 enters the element-side surface 14*b* of the first ultrasonic propagator 14, propagates through the first ultrasonic propagator 14 (arrow B1), and sequentially propagates from the pipe-side surface 14*a* of the first ultrasonic propagator 14 to the acoustic coupling member 13*c* and the damping pipe 13 (arrow B2). Since the acoustic impedances of the first ultrasonic propagator 14 and the damping pipe 13 are close to each other, reflection of the ultrasonic signal at an interface between the first ultrasonic propagator 14 and the damping pipe 13 decreases, and the ultrasonic signal is attenuated by the damping pipe 13. As a result, it is possible to reduce the ultrasonic signal flowing into a reception-side element (the second ultrasonic element 12) via a member such as the center block 2, and as a result, a noise component is reduced so that the measurement accuracy is improved.

After passing through the fluid in the flow path defined by the damping pipe 13 (arrow B3), the ultrasonic signal sequentially propagates to the damping pipe 13 and the acoustic coupling member 13*c* (arrow B4). Next, the ultrasonic signal propagates through the second ultrasonic propagator 15 and is received by the second ultrasonic element 12 (arrow B5). Similarly, reflection at an interface between the second ultrasonic propagator 15 and the damping pipe 13 decreases also in the ultrasonic signal transmitted from the second ultrasonic element 12, and thus, the noise component is reduced.

Figure 6:
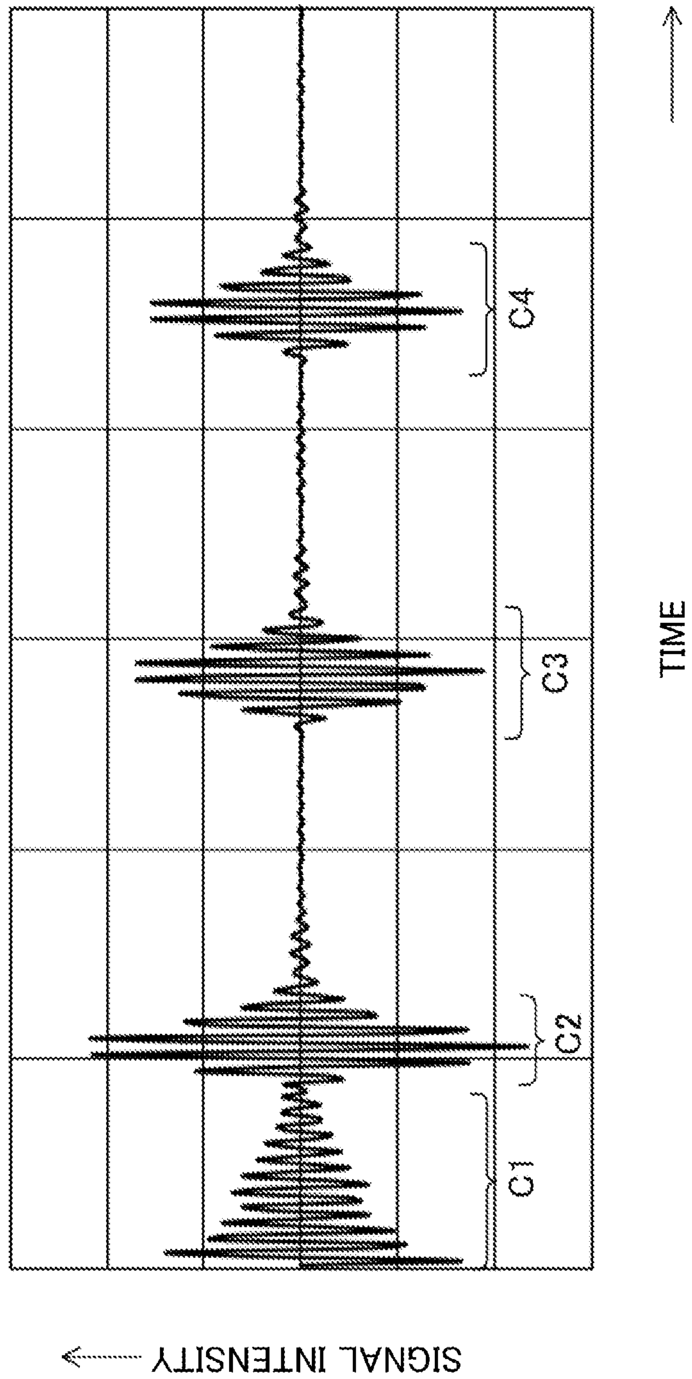
FIG. 6 is a view illustrating an example of a waveform of the received ultrasonic signal.

FIG. 6 illustrates an example of a waveform when the ultrasonic signal transmitted from the first ultrasonic element 11 is received by the second ultrasonic element 12, for example. The horizontal axis represents time, and the vertical axis represents the intensity of the ultrasonic signal. Out of the waveform received by the second ultrasonic element 12, an area C1 received at an initial stage corresponds to a reverberation component in the damping pipe 13. Areas C2, C3, and C4 after the area C1 correspond to multiple reflection signals, respectively. Since the intensity of the area C1 indicating the reverberation component in the damping pipe 13 is weaker than those of the areas C2, C3, and C4 indicating the multiple reflection signals and has a waveform wider in the time axis direction, the waveform of the area C1 is not be suitable for measuring the flow rate in some cases.

In this regard, the flow rate measurement unit 44 of the present embodiment is configured to use the multiple reflection signals after reverberation has converged without using the reverberation component in the damping pipe 13 when executing the propagation time difference type measurement. This makes it possible to enhance the measurement accuracy.

The above-described embodiment is merely an example in all respects, and should not be construed as limiting. Further, all modifications and changes belonging to the equivalent range of the claims fall within the scope of the invention.

Figure 7:
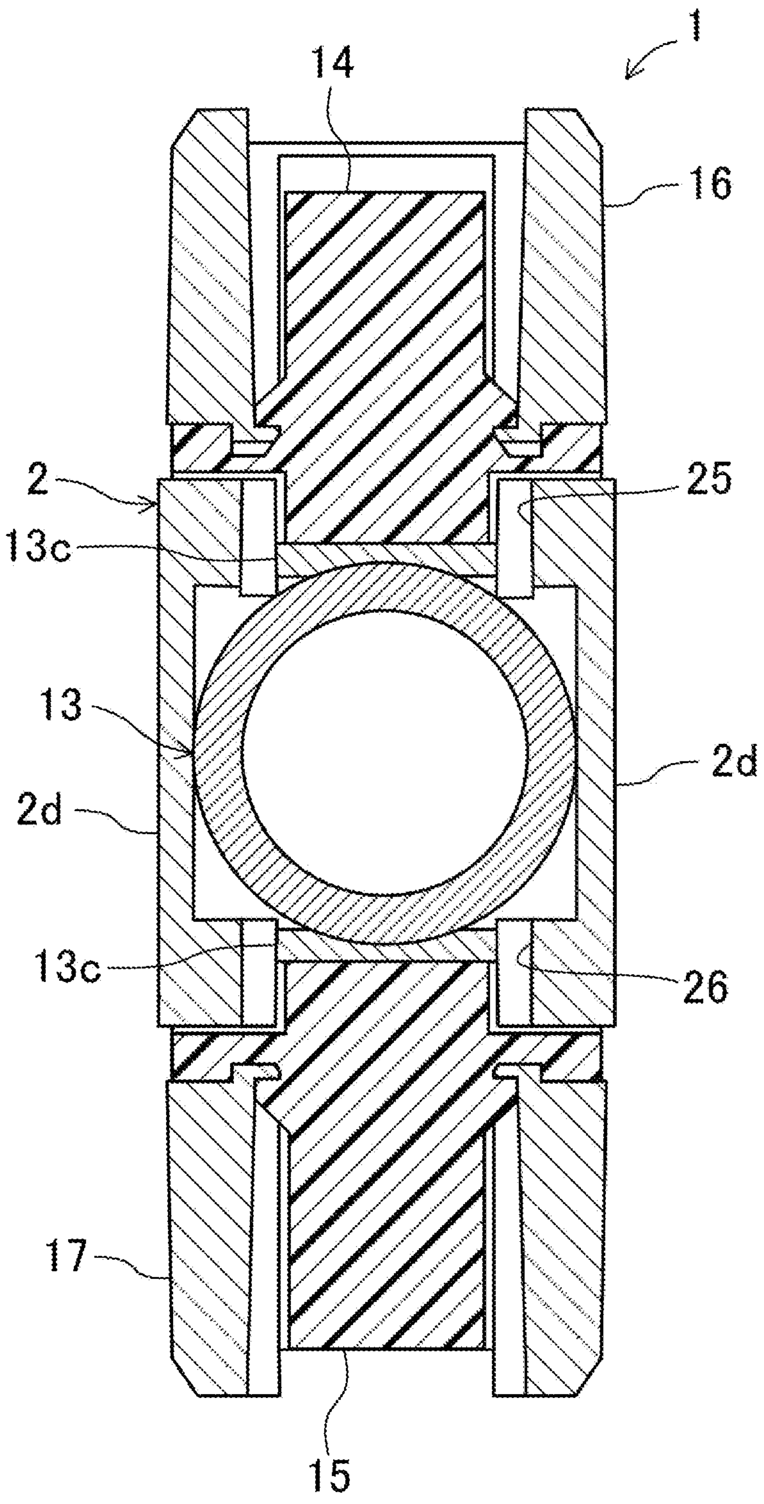
FIG. 7 is a view according to a first modification of the embodiment, which corresponds to FIG. 4.

FIG. 7 illustrates a first modification of the embodiment. In this modification, the center block 2 is provided with support portions 2*d* each supporting the damping pipe 13 from the side. The support portions 2*d* are arranged to support the damping pipe 13 from directions different from the first ultrasonic propagator 14 and the second ultrasonic propagator 15. In this example, the damping pipe 13 is sandwiched between the two support portions 2*d* from both sides in the radial direction. As a result, the damping pipe 13 can be prevented from bending, and a relative position of the damping pipe 13 with respect to the first ultrasonic propagator 14 and the second ultrasonic propagator 15 can be appropriately set.

Further, although not illustrated, the invention can also be applied to an ultrasonic flowmeter of a system in which both the first ultrasonic element 11 and the second ultrasonic element 12 are arranged on one side in the radial direction of the damping pipe 13, and the first ultrasonic element 11 and the second ultrasonic element 12 are arranged to be separated from each other in the pipe axis X direction, that is, a V arrangement system or a reflection arrangement system.

Figure 8:
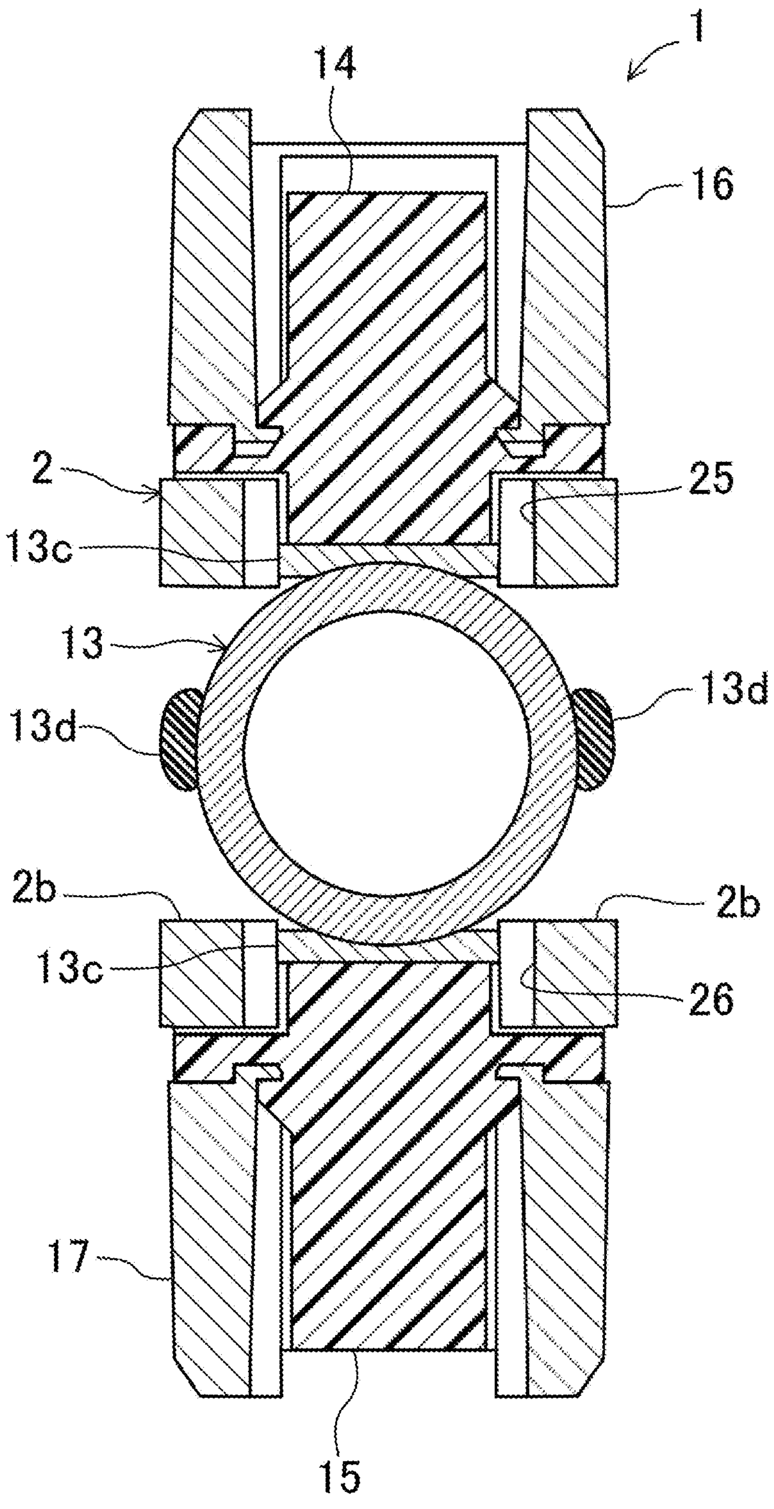
FIG. 8 is a view according to a second modification of the embodiment, which corresponds to FIG. 4.

FIG. 8 illustrates a second modification of the embodiment. The grease 13*d* is provided at four corners of the damping pipe 13 so as to be interposed between the damping pipe 13 and the center block 2 in the example illustrated in FIG. 4. In the second modification, however, grease is provided at two sites on the side respectively facing the side surface openings 2*b* of the damping pipe 13. In the example illustrated in FIG. 4, there is an effect of easily absorbing a stray signal from the ultrasonic elements, but the degree of absorbing even an actual signal transferred to the fluid is large. On the other hand, the example illustrated in FIG. 8 is excellent in that the stray signal can be absorbed and the degree of losing the actual signal is also small although the degree of absorbing the stray signal is weaker.

As described above, the ultrasonic flowmeter according to the invention can be incorporated in, for example, the pneumatic system or the like and used.

What is claimed is:

1. An ultrasonic flowmeter that measures a flow rate of a gas flowing through a flow path using an ultrasonic signal, the ultrasonic flowmeter comprising:

a first ultrasonic element configured to transmit, as a first signal, an ultrasonic signal and receive, as a second signal, an ultrasonic signal;

a second ultrasonic element configured to receive, as the first signal, the ultrasonic signal and transmit, as the second signal, the ultrasonic signal;

a damping pipe defining a flow path;

a first ultrasonic propagator arranged outside the damping pipe, configured to propagate the first signal and the second signal of the ultrasonic signal between the first ultrasonic element and the damping pipe;

a second ultrasonic propagator arranged outside the damping pipe, configured to propagate the first signal and the second signal of the ultrasonic signal between the second ultrasonic element and the damping pipe;

a flow rate measurement unit that measures a flow rate of the gas in the flow path defined by the damping pipe based on the first signal and the second signal of the ultrasonic signal transmitted and received between the first ultrasonic element and the second ultrasonic element;

a housing that accommodates the first ultrasonic element, the first ultrasonic propagator, the damping pipe, the second ultrasonic element, and the second ultrasonic propagator; and a connection interface configured to connect to an external pipe to form a continuous flow path including a flow path of the external pipe and the flow path of the damping pipe, wherein the damping pipe is made of a resin material having a higher ultrasonic signal attenuation capacity than materials forming the first ultrasonic propagator and the second ultrasonic propagator.

2. The ultrasonic flowmeter according to claim 1, wherein an acoustic coupling member is interposed between the damping pipe and the first ultrasonic propagator and between the damping pipe and the second ultrasonic propagator.

3. The ultrasonic flowmeter according to claim 1, wherein the damping pipe has a smooth surface including an inner surface and an outer surface, and the first signal and the second signal of the ultrasonic signal pass through the inner surface and the outer surface.

4. The ultrasonic flowmeter according to claim 1, wherein an inner diameter of the damping pipe is set to be larger than an inner diameter of the external pipe.

5. The ultrasonic flowmeter according to claim 4, wherein an enlarged flow path included in the continuous flow path is provided between the damping pipe and the external pipe, an inner diameter of the enlarged flow path being enlarged as a distance to the damping pipe decreases.

6. The ultrasonic flowmeter according to claim 5, further comprising a connection pipeline disposed between the damping pipe and the connection interface, and forming the enlarged flow path.

7. The ultrasonic flowmeter according to claim 1, further comprising a pressure measurement unit disposed in the housing, configured to measure a pressure of a fluid flowing through the flow path of the damping pipe.

8. The ultrasonic flowmeter according to claim 7, wherein an access path connected the flow path of the damping pipe is provided between the damping pipe and the connection interface, and the pressure measurement unit faces the access path to measure the pressure of the fluid flowing through the flow path of the damping.

9. The ultrasonic flowmeter according to claim 8, further comprising a connection pipeline disposed between the damping pipe and the connection interface, configured to connect, as the continuous flow path, between the flow path of the damping pipe and the flow path of the external pipe, and the access path includes a first channel penetrating through a peripheral wall of the connection pipeline and a second channel connected to the first channel and extending to reach the pressure measurement unit.

10. The ultrasonic flowmeter according to claim 1, wherein the connection interface includes an upstream connection interface for connection with the external pipe on an upstream side to make a flow path of the external pipe on the upstream side communicate with an upstream side of the flow path of the damping pipe, and a downstream connection interface for connection with the external pipe on a downstream side to make a flow path of the external pipe on the downstream side communicate with a downstream side of the flow path of the damping pipe.

11. The ultrasonic flowmeter according to claim 10, wherein the upstream connection interface, the damping pipe, and the downstream connection interface are arranged to be sequentially located on a same straight line from the upstream side to the downstream side in a flow direction of the fluid.

12. The ultrasonic flowmeter according to claim 11, comprising a center block to which an upstream part and a downstream part of the damping pipe are fixed, wherein the upstream connection interface and the downstream connection interface are fixed to the upstream part and the downstream part of the center block, respectively.

13. The ultrasonic flowmeter according to claim 12, wherein the first ultrasonic propagator and the second ultrasonic propagator are fixed to the center block.

14. The ultrasonic flowmeter according to claim 13, wherein the first ultrasonic element is fixed to the first ultrasonic propagator, and the second ultrasonic element is fixed to the second ultrasonic propagator.

15. The ultrasonic flowmeter according to claim 12, wherein the resin material is softer than a material forming the center block.

16. The ultrasonic flowmeter according to claim 1, wherein the resin material is softer than the materials forming the first ultrasonic propagator and the second ultrasonic propagator.

17. The ultrasonic flowmeter according to claim 1, wherein the damping pipe is made of nylon or polyurethane.

* * * * *